US006572785B2

United States Patent
Jüstel et al.

(10) Patent No.: US 6,572,785 B2
(45) Date of Patent: Jun. 3, 2003

(54) PLASMA PICTURE SCREEN WITH RED PHOSPHOR

(75) Inventors: Thomas Jüstel, Aachen (DE); Walter Mayr, Alsdorf (DE); Hans Nikol, Eindhoven (NL)

(73) Assignee: Koninkiljke Phillips Electronics N.V., Eindhoven (NL)

( * ) Notice: Subject to any disclaimer, the term of this patent is extended or adjusted under 35 U.S.C. 154(b) by 0 days.

(21) Appl. No.: 09/741,722

(22) Filed: Dec. 19, 2000

(65) Prior Publication Data

US 2001/0006228 A1 Jul. 5, 2001

(30) Foreign Application Priority Data

Dec. 22, 1999 (DE) .......................................... 199 62 029

(51) Int. Cl.[7] .......................... H01J 17/00; C09K 11/79; C09K 11/86; C09K 11/77

(52) U.S. Cl. .......................... 252/301.4 R; 252/301.4 F; 252/301.4 H; 313/582; 313/584

(58) Field of Search .................. 252/301.4 R, 301.4 F, 252/301.4 H; 313/582, 584

(56) References Cited

FOREIGN PATENT DOCUMENTS

JP          4-55494       *  2/1992

* cited by examiner

Primary Examiner—C. Melissa Koslow

(57) ABSTRACT

A plasma picture screen fitted with a phosphor layer comprising a red phosphor activated by $Eu^{3+}$ shows an improved red color point ($x \geq 0.64$ and $y \leq 0.35$) and shorter decay times $\tau_{1/10}$ as compared with the standard phosphor $(Y,Gd)BO_3$. The phosphor according to the invention has a lattice in which the activator $Eu^{3+}$ occupies a location which has no inversion symmetry.

3 Claims, 4 Drawing Sheets

PLASMA PICTURE SCREEN WITH RED PHOSPHOR

Figure 1:
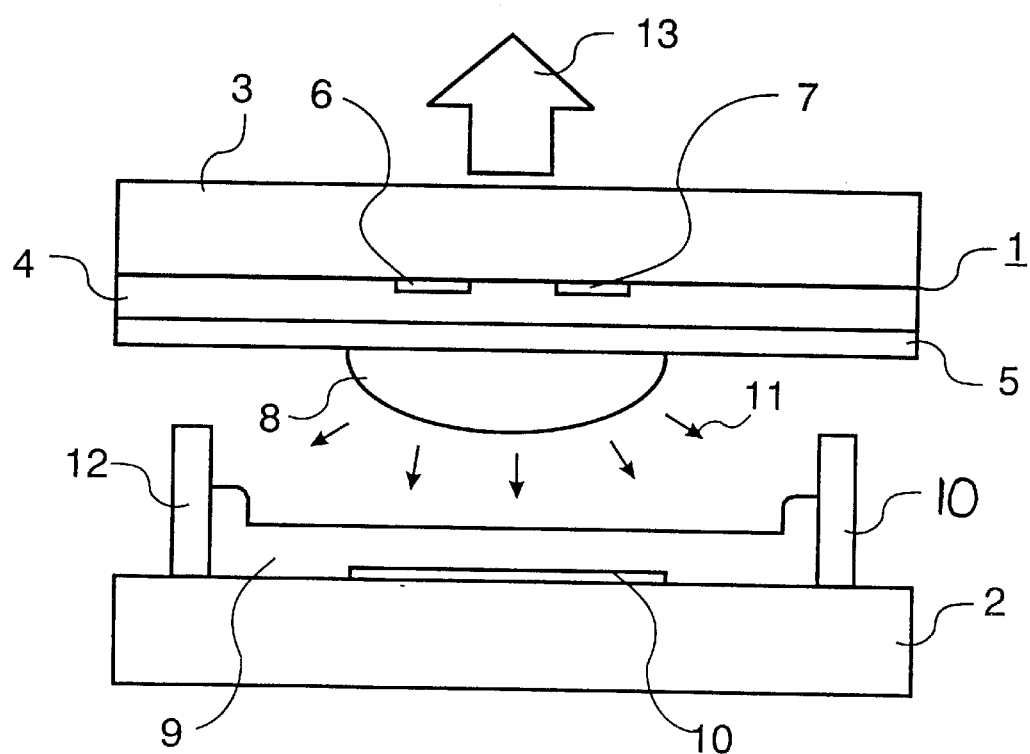

The invention relates to a plasma picture screen provided with a phosphor layer which comprises a red, $Eu^{3+}$-activated phosphor.

Plasma picture screens are capable of showing color images of high resolution, large screen diagonal, and are of a compact construction. A plasma picture screen comprises a hermetically closed glass cell which is filled with a gas and which comprises electrodes arranged in a grid. The application of a voltage gives rise to a gas discharge which generates light in the ultraviolet range. This light is converted into visible light by phosphors and is emitted to the viewer through the front plate of the glass cell.

A red phosphor which is used in many plasma picture screens is $(Y,Gd)BO_3$:Eu, because this phosphor shows a higher light output when excited by VUV radiation than other red-emitting phosphors. Considerable disadvantages of this phosphor are on the one hand the color point, which is too close to orange for video applications with x=0.64 and y=0.35, and on the other hand the comparatively long decay time of $\tau_{1/10}$=9 ms.

The orange color point of $(Y,Gd)BO_3$:Eu leads to a smaller range of colors in plasma picture screens compared with cathode ray tubes in which $Y_2O_2S$:Eu is used as the red phosphor. The latter has a color point of x=0.66 and y=0.33.

The color point and the decay time $\tau_{1/10}$ of a phosphor activated by $Eu^{3+}$ depend on the local symmetry of the lattice locations occupied by the $Eu^{3+}$ cations in the phosphor host lattice. In $YBO_3$, $GdBO_3$, and $(Y,Gd)BO_3$, which have a pseudo-vaterite lattice, the $Eu^{3+}$ cation occupies two crystallographic locations with a slightly distorted $S_6$ symmetry. As a consequence, electrical dipole transitions $^5D_0$-$^7F_{2,4}$, which are forbidden in an $S_6$ symmetry or $D_{3d}$ symmetry, can be observed.

The spectroscopic selection rules are less stringent owing to the distortion, and the emission spectrum of $(Y,Gd)BO_3$:Eu shows two intensive lines at 612 and 627 nm which can be ascribed to the $^5D_0$-$^7F_2$ transition. Two emission lines are obtained owing to the crystal field splitting of the $^7F_2$ level. The most intensive emission line, however, is formed by the magnetic dipole transition $^5D_0$-$^7F_1$ at 595 nm. The high intensity of the emission line at 595 nm is responsible for the orange color point of this phosphor. The smaller transition probability of a magnetic dipole transition leads to longer emission decay times of this phosphor.

The invention has for its object to provide a red phosphor with an improved color point and a shorter decay time $\tau_{1/10}$ for plasma picture screens.

The object is achieved by means of a plasma picture screen provided with a phosphor layer which comprises a red, $Eu^{3+}$-activated phosphor, which screen has a host lattice with a crystal structure in which the $Eu^{3+}$ cations occupy locations without inversion symmetry.

Electrical dipole transitions $^5D_0$-$^7F_{2,4,6}$ of the $Eu^{3+}$ cation are allowed according to the spectroscopic selection rules in a phosphor in which the $Eu^{3+}$ cation occupies lattice locations in the crystal structure of the host lattice which have no inversion symmetry center. Such transitions are forbidden when the $Eu^{3+}$ cation occupies locations in the lattice which have an inversion symmetry. In that case only a magnetic dipole transition $^5D_0$-$^7F_1$ is allowed.

Accordingly, phosphors having a lattice in which the $Eu^{3+}$ cations occupy locations without inversion symmetry show intensive emission bands in a range from 610 to 630 nm which are based on electrical dipole transitions.

It is preferable that the phosphor comprises a lattice with a fergusonite structure, aragonite structure, thortveitite structure, matlockite structure, or xenotim structure.

The $Eu^{3+}$ cation occupies a trivalent lattice location without inversion symmetry in these host lattices.

It is furthermore preferable that the phosphor is chosen from the group comprising $Ba_2Gd_2(Si_xGe_{1-x})_4O_{13}$, $(Y_xGd_{1-x})NbO_4$, $(Y_xGd_{1-x})TaO_4$, $(Y_xGd_{1-x})OF$, $(Y_xGd_{1-x})OCl$ and $(Sc_xLu_{1-x})_2Si_2O_7$, for which it holds in all cases that $0 \leq x \leq 1$.

These phosphors with $Eu^{3+}$ as the activator have color points with $x \geq 0.65$ and $y \leq 0.35$.

It is furthermore preferred that the proportion of $Eu^{3+}$ in the phosphor lies between 0.5 and 10 mole %.

The proportion of $Eu^{3+}$ must not be too low, because then the absorption of the UV radiation is too low. On the other hand, the proportion must not be too high, because then the light output is too small owing to concentration quenching.

Figure 2:
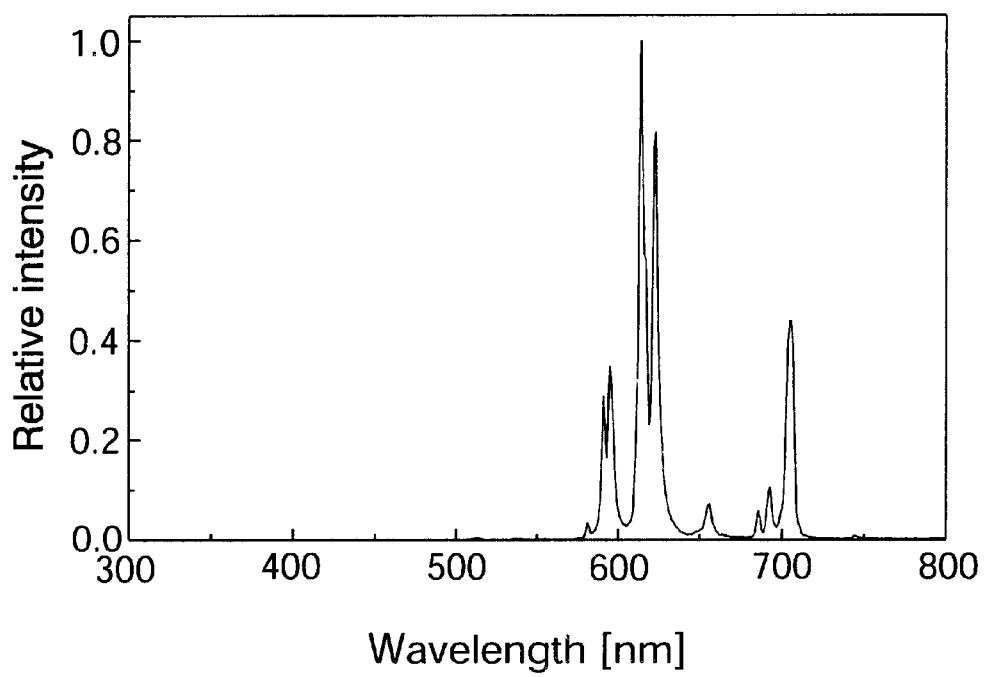
Figure 3:
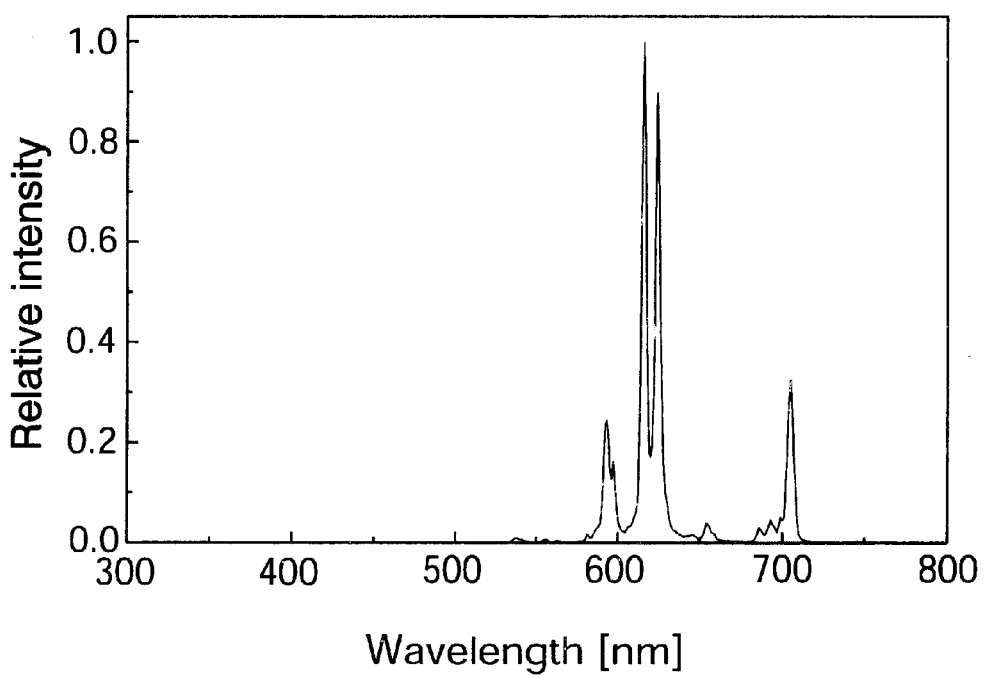
Figure 4:
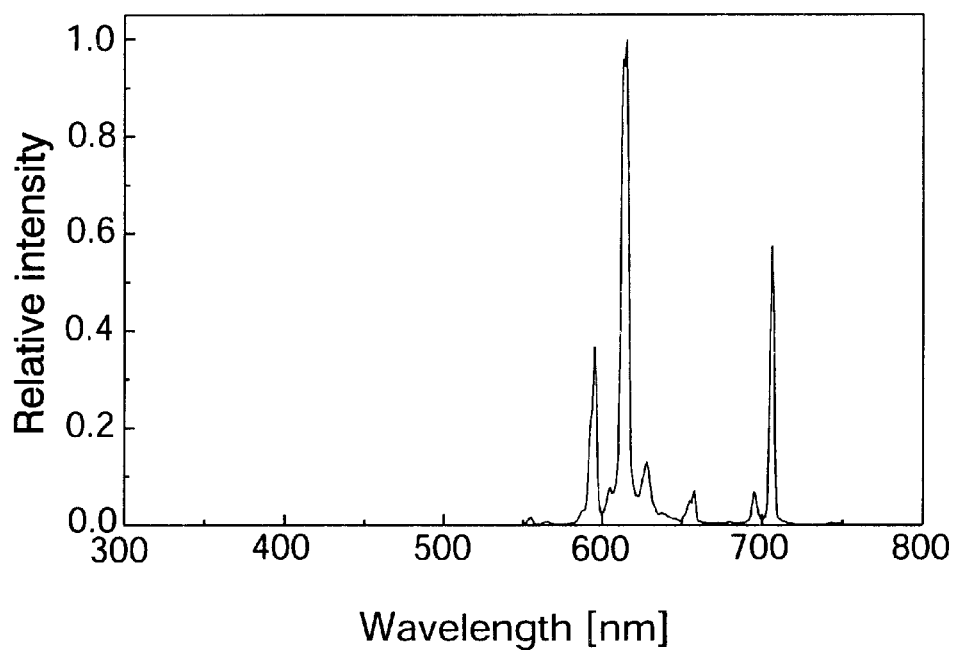
Figure 5:
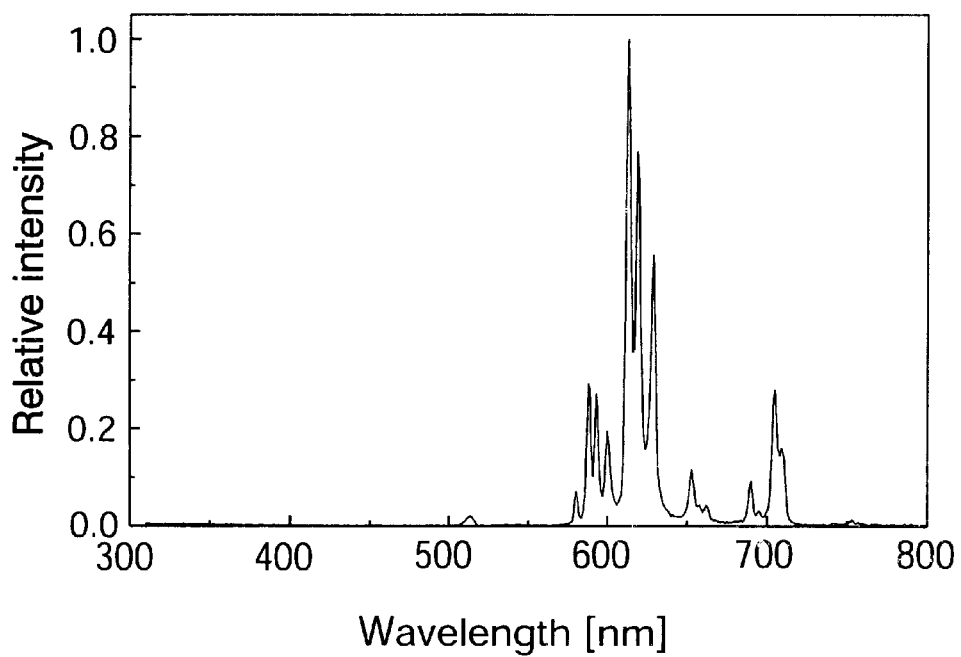
Figure 6:
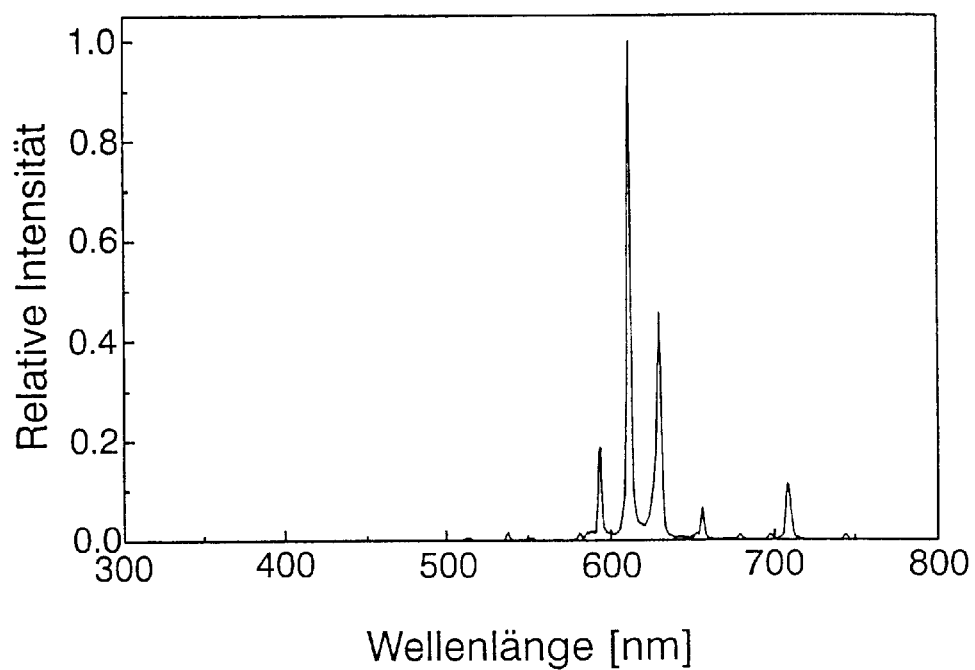
Figure 7:
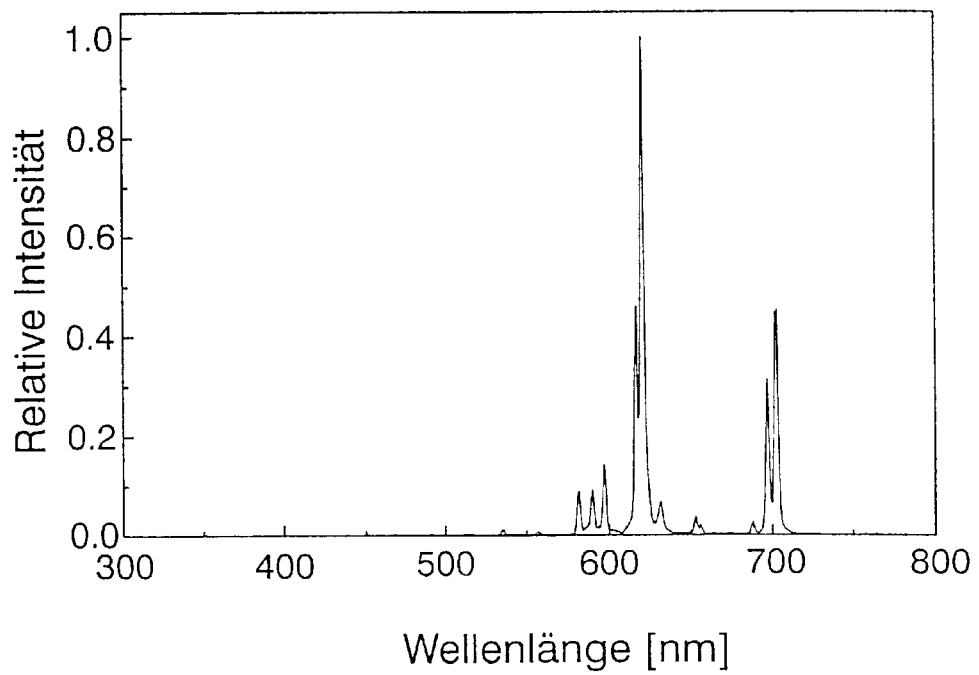

The invention will now be explained in more detail below with reference to seven Figures and six embodiments, in which FIG. 1 shows the construction and operating principle of a single plasma cell in an AC plasma picture screen, FIG. 2 shows the emission spectrum of $Ba_2Gd_2Si_4O_{13}$:Eu, FIG. 3 shows the emission spectrum of $Ba_2Gd_2Ge_4O_{13}$:Eu, FIG. 4 shows the emission spectrum of $(Y_{0.5}Gd_{0.5})NbO_4$:Eu, FIG. 5 shows the emission spectrum of $Sc_2Si_2O_7$:Eu, FIG. 6 shows the emission spectrum of $(Y_{0.5}Gd_{0.5})OF$:Eu, and FIG. 7 shows the emission spectrum of $(Y_{0.5}Gd_{0.5})OCl$:Eu.

In FIG. 1, a plasma cell of an AC plasma picture screen with a coplanar construction comprises a front plate 1 and a back plate 2. The front plate 1 comprises a glass plate 3 on which a dielectric layer 4 and thereon a protective layer 5 are provided. The protective layer 5 is preferably made of MgO and the dielectric layer 4 is made, for example, of glass containing PbO. Parallel, strip-type discharge electrodes 6, 7 are provided on the glass plate 3 such that they are covered by the dielectric layer 4. The discharge electrodes 6, 7 are made, for example, from metal or ITO. The back plate 2 is made of glass, and parallel, strip-type address electrodes 10, for example made of Ag, are provided on the back plate 2 perpendicularly to the discharge electrodes 6, 7. Said address electrodes are covered with phosphor layers 9 in one of the three basic colors: red, green, or blue. The individual phosphor layers 9 are separated by barriers 12 which are preferably formed from a dielectric material.

A gas, preferably a rare gas mixture of, for example He, Ne, Xe, or Kr, is present in the discharge cell, also between the discharge electrodes 6, 7, which form the cathode and anode. After the surface discharge has been ignited, whereby charges can flow along a discharge path which lies between the discharge electrodes 6, 7 in the plasma region 8, a plasma is formed in said plasma region 8 by which preferably radiation 11 in the UV range or in the VUV range is generated. This radiation 11 excites the phosphor layer 9 into phosphorescence, emitting visible light 13 in one of the three basic colors, which light issues to the exterior through the front plate 1 and thus forms a luminous pixel on the picture screen.

Red phosphors used are, for example, $Eu^{3+}$ activated phosphors such as $Ba_2Gd_2(Si_xGe_{1-x})_4O_{13}$:Eu, $(Y_xGd_{1-x})NbO_4$:Eu, $(Y_xGd_{1-x})TaO_4$:Eu, $(Y_xGd_{1-x})OF$:Eu, $(Y_xGd_{1-x})$ OCl:Eu, or $(Sc_xLu_{1-x})_2Si_2O_7$:Eu, for which it holds in all cases that $0 \leq x \leq 1$.

Possible manufacturing processes for the phosphor layer are both dry coating processes, for example electrostatic deposition or electrostatically supported dusting, and wet coating processes, for example silk-screen printing, dispenser processes in which a suspension is provided by means of a nozzle moving along the channels, or sedimentation from the liquid phase.

In the case of wet coating processes, the phosphors are to be dispersed in water, an organic solvent, possibly together with a dispersing agent, a surfactant, and an anti-foaming agent, or a binder mixture. Suitable binder mixtures for plasma picture screens are organic and inorganic binders which can withstand an operating temperature of 250° C. without decomposition, brittling, or discoloration.

After the phosphor layer has been provided, the back plate 2 is used together with further components such as, for example, a front plate 1 and a rare gas mixture, for the manufacture of an AC plasma picture screen. In principle, a phosphor according to the invention may also be used for other types of plasma picture screens such as, for example, plasma picture screens with a matrix arrangement or DC plasma picture screens.

FIGS. 2 to 7 show the emission spectra of a few red-emitting phosphors according to the invention which comprise a proportional quantity of $Eu^{3+}$ activator of 5 mole %.

Embodiments of the invention are discussed below, representing possibilities of how the invention may be realized in practice.

Embodiment 1

5.00 g (25.3 mmole) $BaCO_3$, 3.14 g (50.7 mmole) $SiO_2$, 4.13 g (11.4 mmole) $Gd_2O_3$, and 446 mg (1.27 mmole) $Eu_2O_3$ were suspended in water and treated for 10 minutes in an ultrasonic bath. After the water had been removed through distillation, the resulting powder was pounded in a mortar. Then the powder mixture was calcined for 1 hour at 1250° C., pounded fine, and calcined again for 1 hour at 1250° C. The resulting phosphor powder $Ba_2Gd_{1.8}Si_4O_{13}$:$Eu_{0.2}$ was once more pounded fine. The emission spectrum of this phosphor is shown in FIG. 2.

A suspension was subsequently prepared with this phosphor and additives such as an organic binder and a dispersing agent. The suspension was provided on a back plate 2 by silk-screen printing and dried. This process step was carried out in succession for the other two phosphor types with the emission colors green and blue.

A thermal treatment of the back plate 2 at 600° C. in an atmosphere containing oxygen served to remove all additives still remaining in the phosphor layers 9. Such a back plate 2 was then used for manufacturing a plasma picture screen.

Embodiment 2

5.00 g (25.3 mmole) $BaCO_3$, 5.30 g (50.7 mmole) $GeO_2$, 4.13 g (11.4 mmole) $Gd_2O_3$, and 446 mg (1.27 mmole) $Eu_2O_3$ were mixed and pounded fine. Then the powder mixture was calcined for 1 hour at 1200° C., pounded fine, and once more calcined for 1 hour at 1250° C. The resulting phosphor powder $Ba_2Gd_{1.8}Ge_4O_{13}$:$Eu_{0.2}$ was pounded once more. The emission spectrum of this phosphor is shown in FIG. 3.

A suspension was subsequently prepared with this phosphor and additives such as an organic binder and a dispersing agent. The suspension was provided on a back plate 2 by silk-screen printing and dried. This process step was carried out in succession for the other two phosphor types with the emission colors green and blue.

A thermal treatment of the back plate 2 at 600° C. in an atmosphere containing oxygen served to remove all additives still remaining in the phosphor layers 9. Such a back plate 2 was then used for manufacturing a plasma picture screen.

Embodiment 3

2.41 g (6.64 mmole) $Gd_2O_3$, 1.50 g (6.64 mmole) $Y_2O_3$, 406 mg (1.15 mmole) $Eu_2O_3$, and 3.84 g (14.4 mmole) $Nb_2O_5$ were mixed and pounded fine. The resulting powder was calcined for 4 hours at 1250° C. and then introduced into an aqueous solution of $Li_2SO_4$ (25% by weight). The resulting mixture was heated to boiling point for 2 hours. The phosphor $(Y_{0.5}Gd_{0.5})NbO_4$:Eu was filtered, dried for 2 hours at 80° C., and then calcined at 1100° C. The lattice of the phosphor showed a fergusonite structure. The emission spectrum of this phosphor is shown in FIG. 4.

A suspension was subsequently prepared with this phosphor and additives such as an organic binder and a dispersing agent. The suspension was provided on a back plate 2 by silk-screen printing and dried. This process step was carried out in succession for the other two phosphor types with the emission colors green and blue.

A thermal treatment of the back plate 2 at 600° C. in an atmosphere containing oxygen served to remove all additives still remaining in the phosphor layers 9. Such a back plate 2 was then used for manufacturing a plasma picture screen.

Embodiment 4

5.00 g (36.3 mmole) $Sc_2O_3$, 4.72 g (78.6 mmole) $SiO_2$, and 670 mg (1.91 mmole) $Eu_2O_3$ were suspended in water and treated for 10 minutes in the ultrasonic bath. After the water had been removed by distillation, the resulting powder was pounded in a mortar, calcined for 12 hours at 1400° C., and pounded once more. After 520 mg (14.0 mmole) $NH_4F$ had been added, the resulting powder was once more calcined for 12 hours at 1400° C. Then the resulting phosphor powder $Sc_2Si_2O_7$:Eu was pounded fine. The lattice of the phosphor showed a thorveitite structure. The emission spectrum of this phosphor is shown in FIG. 5.

A suspension was subsequently prepared with this phosphor and additives such as an organic binder and a dispersing agent. The suspension was provided on a back plate 2 by silk-screen printing and dried. This process step was carried out in succession for the other two phosphor types with the emission colors green and blue.

A thermal treatment of the back plate 2 at 600° C. in an atmosphere containing oxygen served to remove all additives still remaining in the phosphor layers 9. Such a back plate 2 was then used for manufacturing a plasma picture screen.

Embodiment 5

2.50 g (11.1 mmole) $Y_2O_3$, 4.01 g (11.1 mmole) $Gd_2O_3$, and 410 mg (1.17 mmole) $Eu_2O_3$ were dissolved in $HNO_3$. The resulting solution was adjusted to a pH value of 4 and heated to 60° C. The oxides were precipitated again through the addition of oxalic acid in a five-fold excess quantity and stirring for 15 minutes. The oxalates which were also precipitated were decomposed in a thermal treatment at 900° C. Then the oxides were suction-filtered, washed twice with distilled water, dried for 3 hours at 120° C., and then calcined for 3 hours at 1000° C. After the addition of 1.73 g (46.6 mmole) $NH_4F$, the resulting mixture was calcined in a nitrogen atmosphere in a covered crucible for one hour at 950° C. The resulting phosphor powder $(Gd_{0.5}Y_{0.5})OF$:Eu was pounded fine once more. The emission spectrum of this phosphor is shown in FIG. 6.

A suspension was subsequently prepared with this phosphor and additives such as an organic binder and a dispersing agent. The suspension was provided on a back plate 2 by silk-screen printing and dried. This process step was carried out in succession for the other two phosphor types with the emission colors green and blue.

A thermal treatment of the back plate 2 at 600° C. in an atmosphere containing oxygen served to remove all additives still remaining in the phosphor layers 9. Such a back plate 2 was then used for manufacturing a plasma picture screen.

Embodiment 6

1.56 g (6.90 mmole) $Y_2O_3$, 2.50 g (6.90 mmole) $Gd_2O_3$, 202 mg (574 μmole) $Eu_2O_3$, and 1.54 g (28.7 mmole) $NH_4Cl$ were mixed and pounded in a mortar. The resulting powder was heated for 4 hours at 400° C. in a covered crucible and subsequently pounded once more. After the addition of 214 mg (2.87 mmole) KCl, the resulting solid was calcined for 4 hours at 900° C. in a covered crucible. The resulting phosphor powder $(Gd_{0.5}Y_{0.5})OCl:Eu$ was pounded once more. The lattice of the phosphor showed a matlockite structure. The emission spectrum of this phosphor is shown in FIG. 7.

A suspension was subsequently prepared with this phosphor and additive such as an organic binder and a dispersing agent. The suspension was provided on a back plate 2 by silk-screen printing and dried. This process step was carried out in succession for the other two phosphor types with the emission colors green and blue.

A thermal treatment of the back plate 2 at 600° C. in an atmosphere containing oxygen served to remove all additives still remaining in the phosphor layers 9. Such a back plate 2 was then used for manufacturing a plasma picture screen.

TABLE 1

Properties of selected red phosphors with a 5% content of $Eu^{3+}$ activator in relation to the trivalent host lattice cation

| Phosphor | Crystal Lattice | Color Point [x,y] | Luminous Efficacy [lm/W] | Decay Time $\tau_{1/10}$ [ms] |
|---|---|---|---|---|
| $Ba_2Gd_2Si_4O_{13}$:Eu | monoclinic | 0.655, 0.340 | 240 | 3.0 |
| $Ba_2Gd_2Ge_4O_{13}$:Eu | monoclinic | 0.655, 0.335 | 245 | 3.0 |
| $(Y_{0.5}Gd_{0.5})NbO_4$:Eu | monoclinic | 0.650, 0.340 | 250 | 4.0 |
| $Sc_2Si_2O_7$:Eu | monoclinic | 0.650, 0.340 | 250 | 4.0 |
| $(Y_{0.5}Gd_{0.5})OF$:Eu | trigonal | 0.655, 0.355 | 260 | 2.5 |
| $(Y_{0.5}Gd_{0.5})OCl$:Eu | tetragonal | 0.650, 0.340 | 210 | 2.0 |
| $(Sc,Lu)_2Si_2O_7$:Eu | monoclinic | 0.650, 0.340 | 250 | 2.5 |

All phosphors according to the invention show a red color point and a substantially shorter decay time $\tau_{1/10}$ as compared with $(Y,Gd)BO_3$:Eu.

What is claimed is:

1. A plasma picture screen provided with a phosphor layer which comprises a red $EU^{3+}$—activated phosphor, which screen has a host lattice with a crystal structure in which the $EU^{3+}$ cations occupy locations without inverse symmetry and wherein the phosphor is selected from the group of phosphors consisting of $Ba_2Gd_2(Si_xGe_{1-x})_4O_{13}$:Eu, $(Y_xGd_{1-x})NbO_4$:Eu, $(Y_xGd_{1-x})OF$:Eu, $(Y_xGd_{1-x})OCl$ and $(Sc_xLu_{1-x})_2Si_2O_7$, in all said phosphors $0 \leq x \leq 1$.

2. A plasma picture screen as claimed in claim 1, characterized in that the phosphor comprises a lattice with a fergusonite structure, aragonite structure, thorveitite structure, matlockite structure, or xenotim structure.

3. A plasma picture screen as claimed in claim 1, characterized in that the proportion of $Eu^{3+}$ in the phosphor lies between 0.5 and 10 mole %.

* * * * *

UNITED STATES PATENT AND TRADEMARK OFFICE
CERTIFICATE OF CORRECTION

PATENT NO.   : 6,572,785 B2
DATED        : June 3, 2003
INVENTOR(S)  : Thomas Justel, Walter Mayr and Hans Nikol It is certified that error appears in the above-identified patent and that said Letters Patent is hereby corrected as shown below:

<u>Title page,</u>
Item [73], Assignee, change "Phillips" to -- Philips --.

Signed and Sealed this

Thirtieth Day of September, 2003

JAMES E. ROGAN
*Director of the United States Patent and Trademark Office*